E. H. ODERMAN.
VEHICLE SPRING.
APPLICATION FILED JUNE 9, 1917.

1,307,596.  
Patented June 24, 1919.

E. H. Oderman  
Inventor

By Geo. P. Kimmel  
Attorney

UNITED STATES PATENT OFFICE.

ERIK HERMAN ODERMAN, OF WAYNESBORO, PENNSYLVANIA.

VEHICLE-SPRING.

1,307,596.  Specification of Letters Patent.  Patented June 24, 1919.

Application filed June 9, 1917. Serial No. 173,796.

*To all whom it may concern:*

Be it known that I, ERIK HERMAN ODERMAN, a citizen of the United States, and resident of Waynesboro, in the county of Franklin and State of Pennsylvania, have invented certain new and useful Improvements in Vehicle-Springs, of which the following is a specification.

This invention relates to new and useful improvements in vehicle springs, and the primary object of the invention is to provide a simple and efficient type adapted to be positioned between the vehicle axle and the frame, which gives a greater amount of resiliency than that obtained from the conventional type of leaf spring such as is ordinarily employed.

Another object of the invention is to provide a device of this character which is easily and simply constructed, inexpensive to manufacture, and one which will be very efficient in operation.

With these and numerous other objects in view, my invention consists of the novel features of construction, combination and arrangement of parts which will be hereinafter referred to and more particularly pointed out in the specification and claim.

In the accompanying drawings.

In describing my invention I shall refer to the drawings in which similar reference characters designate corresponding parts throughout the several views.

Figure 1:
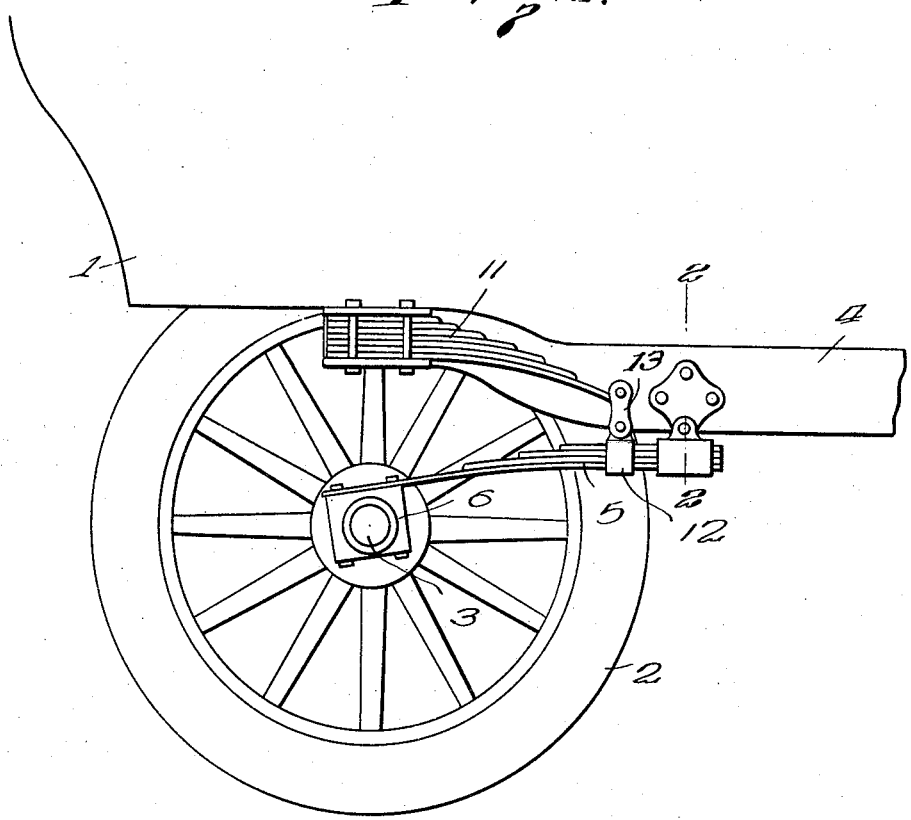
Figure 1 is a side elevation view of the device applied.
Figure 2:
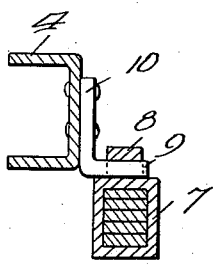
Fig. 2 is a vertical section taken on the line 2—2 of Fig. 1.

The numeral 1 designates the body of a vehicle, the device being shown applied to an automobile, and the numeral 2 is a wheel of the conventional type, that is mounted on an axle 3. The body 1 is supported on a frame 4 of the usual construction, and connecting the axle 3 and the frame 4 is a leaf spring 5, which is provided with a bearing block 6 surrounding the axle 3, and connected with one end of the spring, while the other end of the said spring is supported adjacent one side of the frame 4 by means of a supporting member 7 that surrounds the spring adjacent said end and which has an eye 8 formed on its upper surface that is pivotally mounted on a projecting pivot pin 9, that is secured as shown at 10 to one side of said frame. The thicker portion of the spring 5 is connected with the frame 4 by the pivotal connection just described, and the said spring extends rearwardly, and has its free end connected with the bearing block 6 mounted on the axle 3.

A supplemental leaf spring 11 is employed which has its thicker end connected with the end of the frame 4, while a link 13 is connected with the free end of said spring, said link having its lower end connected as at 12 with the spring 5, adjacent the end of said spring that is pivotally connected with the frame 4.

These springs are disposed substantially parallel, one of the springs, that is the main spring 5 being mounted on the axle 6, and pivoted to the frame, while the other spring 11 is rigidly connected with the frame 4, and has its lower end connected by a link with the spring 5 intermediate the ends of the same. In operation this arrangement of springs will give the vehicle the desired amount of resiliency, so as to take all the shocks and jars incidental to the operation thereof. The device may be very economically manufactured, owing to its extreme simplicity of construction, and the same will be found very efficient in operation.

From the above description taken in connection with the accompanying drawings, it is thought that a clear and comprehensive understanding of the construction, operation and advantages of my invention may be had, and while I have shown and described a device embodying a specific structure, I desire to have it understood that such changes may be made in said structure as do not depart from the spirit and scope of the invention as claimed.

Having fully described my invention, what I claim as new, and desire to secure by Letters Patent is:

A vehicle spring suspension including a spring connected at one end to the vehicle axle and pivoted at its remaining end to the vehicle chassis, and a second spring fixedly connected at one of its ends to the vehicle body and pivotally connected at its remaining end to said first spring at a point spaced from but in proximity to the pivotal connection of the same with the vehicle chassis.

In testimony whereof, I affix my signature hereto.

ERIK HERMAN ODERMAN.